July 19, 1927.

W. DREDGE 1,636,504

HEATING OVEN FOR BAKING, ROASTING, DRYING, AND LIKE PURPOSES

Filed June 12, 1924    2 Sheets-Sheet 1

Inventor.
William Dredge,
By George Cecil Dymond
Attorney.

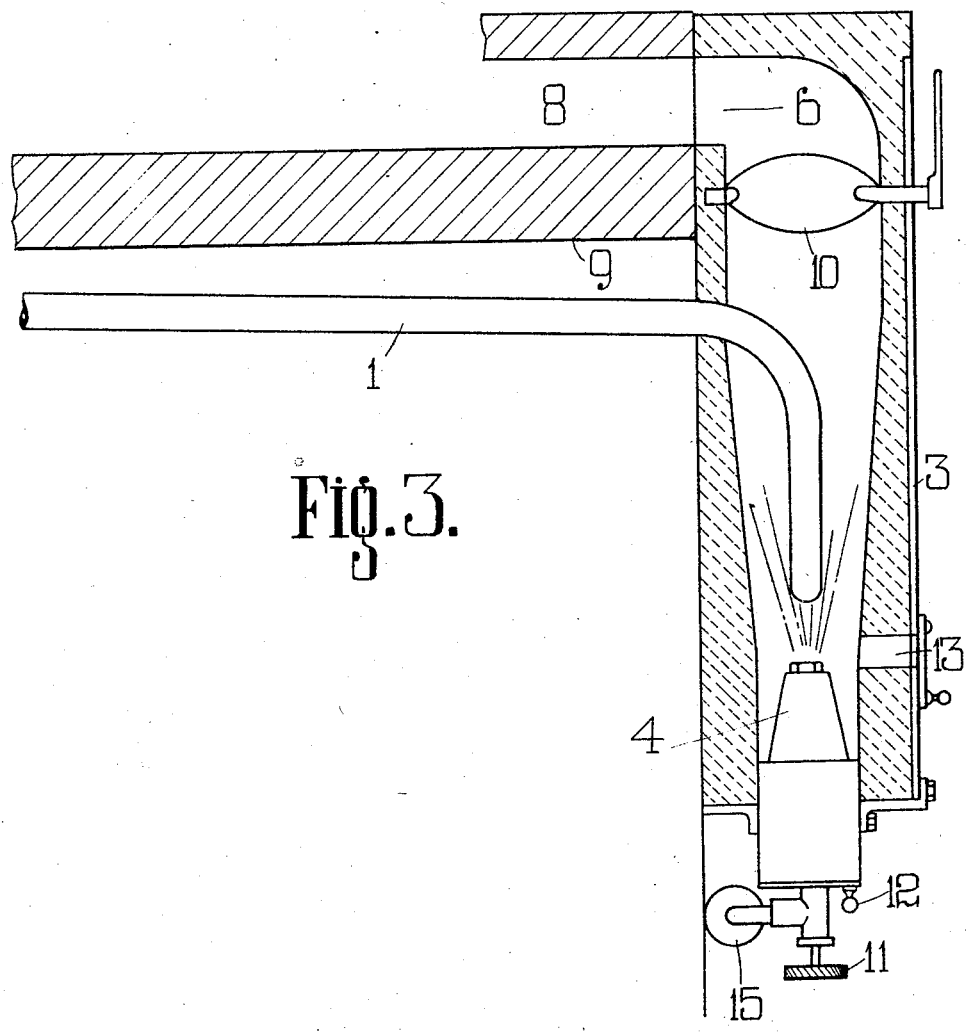

Patented July 19, 1927.

1,636,504

UNITED STATES PATENT OFFICE.

WILLIAM DREDGE, OF MANCHESTER, ENGLAND.

HEATING OVEN FOR BAKING, ROASTING, DRYING, AND LIKE PURPOSES.

Application filed June 12, 1924, Serial No. 719,610, and in Great Britain June 15, 1923.

This invention relates to improvements in means for heating ovens for baking, roasting, drying and like purposes, in which the heating is effected by hermetically sealed tubes (hereinafter called oven tubes) of any well known make containing liquid to convey and distribute the heat.

The usual method of applying heat to these oven tubes is to concentrate all their ends into one common furnace, which is open to allow air to enter to facilitate combustion and has an outlet or chimney to allow smoke, products of combustion and volatile gases to escape to the atmosphere. This is a very inefficient method, as a great quantity of the heat generated in the furnace must necessarily be wasted and a further disadvantage is that it is impossible to get the desired even temperature in the oven.

Now according to my present invention each of the oven tubes is heated separately at one end by an independently controllable high pressure gaseous fuel burner or other suitable fuel-burner or burners acting on the said tube within a conduit of refractory material which will be hereinafter called the tube-heating chamber. By this means the heating of the individual tubes can be directly and independently controlled.

To this end, in one arrangement, the tube heating chamber consists of a casing, of cylindrical or other suitable form, surrounding the end of each oven tube, and suitably spaced therefrom, and extending for a certain distance along the part of the tube to be heated, whereby the heat from the burner is confined and applied over a certain area of the tube end. The said cylindrical casing is formed of a refractory substance and may have an outside covering of metal.

In some cases the tubes may be arranged in a small group, say three, and each tube is completely surrounded by a cylinder of insulating material, such as burnt fireclay, moulded integral with the other cylinders in the group, and having a metal casing. In such case a burner will be provided for each tube.

By this means the heat from the high pressure gas or other burner is concentrated by the tube heating chamber around the end of the tube to be heated.

Instead of the heated products of combustion passing away into the atmosphere from the tube-heating chambers, an outlet is provided in the top of the heating chambers, through which outlet the heated products of combustion can pass into a jacket or chamber above the oven chamber, or in some cases into an external jacket. The outlets from the tube-heating chambers may connect with a common collecting pipe.

The burners are directly and individually controlled by suitable valves, whereby the desired even temperature may be obtained in any part of the oven chamber in which the baking, roasting or drying is to be effected.

The invention will now be further described with reference to the accompanying drawings, in which:—

Figure 3 is a sectional elevation of portion of an oven showing the tube-heating chambers arranged in the vertical position, and the oven tubes with downwardly bent ends.

Figure 1:
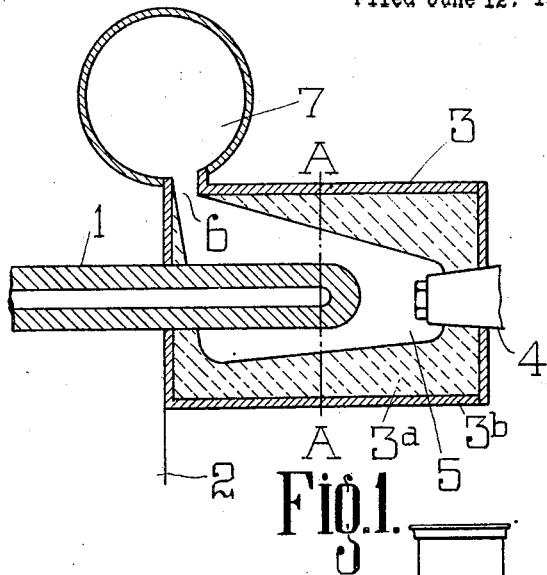
Figure 1 is a longitudinal section of one form of the tube-heating chambers or casings.
Figure 2:
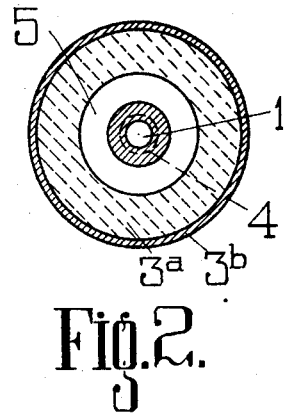
Figure 2 is a cross section of same on line A—A of Fig. 1.

Referring first to Figs. 1 and 2, 1 denotes the hermetically sealed liquid-containing oven tube of well known kind. One end of this tube projects through the side wall 2 of the oven, and is surrounded by a cylindrical heating chamber or casing 3 formed of a refractory substance 3ª such as fireclay, and having an outer metal casing 3ᵇ. 4 is a high pressure gaseous fuel burner, which passes through the end of the tube heating chamber 3, and is directly controlled by a suitable valve. The inner wall of the tube heating chamber is spaced a suitable distance away from the tube 1, as indicated at 5 in the figures. The flame from the high pressure gas or other burner 4 impinges on the thickened end of the tube 1, and the refractory casing 3 will become heated and radiate heat against the tube 1 and so maintain a steady uniform heat which can be controlled by the valve.

The tube-heating chamber may have inwardly projecting lugs to position the oven tube, or a thin rib or thread may be arranged to contact with the oven tube and direct a current of heat in a helical path round the tube.

The heated products of combustion may pass through an outlet 6 into a pipe or other common collecting chamber 7 from which they can be delivered into a jacket immediately above the crown of the oven, or other place of use.

In the arrangement shown in Fig. 3 the tube-heating chamber or casing 3 is arranged in the vertical position, and the end of each of the tubes 1 to be heated is bent downwardly within the casing. In this case each tube-heating chamber 3 has an opening 6 at the top through which the heated products of combustion pass directly into a jacket or chamber 8 above the crown 9 of the oven. As will be seen, the internal diameter of the tube-heating chamber 3 increases in the upward direction, and a butterfly-valve 10 is provided for controlling the outlet to the jacket 8. The burner 4 is regulated by the valve 11, and is provided with means 12 for regulating the admission of air to obtain complete combustion. 13 is a peep-hole with cover flap for allowing the working of the burner to be inspected.

Figure 4:
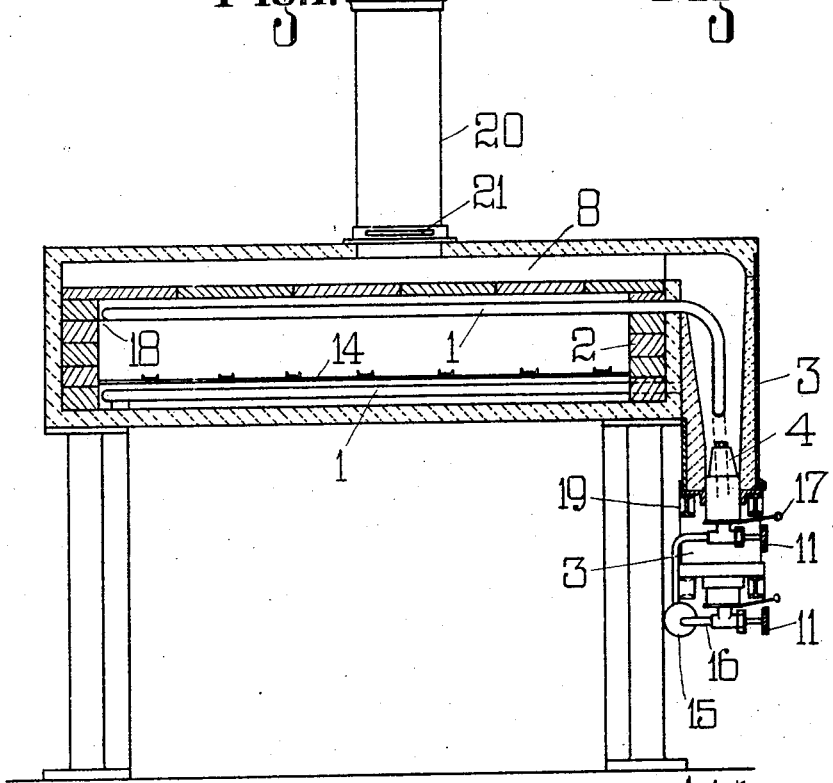
Fig. 4 is a cross section of a travelling oven with my heating arrangement applied thereto.

The heating arrangement according to my invention is shown applied to a travelling-oven in Fig. 4. Two sets of oven tubes 1 are here provided. One set is arranged below the travelling sole-plate 14 and the other set arranged above it, the two sets of tubes being arranged in a staggered relationship. The oven tubes are carried at the end to be heated through the side wall 2 of the oven into heating chambers or conduits 3, as already described. A main pipe 15 supplying coal gas under high pressure, or other suitable fuel such as oil, is arranged along the side of the oven, and from this pipe 8 branch pipes 16 diverge, with a burner 4 directed into the heating chamber of each tube. Valves 11 control the supply of fuel to the burner and the admission of air to obtain complete combustion is controlled by rotary slides 17. The heated products of combustion from each tube heating chamber 3 pass into the jacket or chamber 8 above the oven crown as already described.

The inner end of the oven tubes 1 may be supported in the oven chamber on angle-irons 18.

The lower end of the tube-heating chambers 3 are suitably supported on girders 19.

20 is an outlet to the chimney from the jacket or chamber 8, controlled by a damper 21.

The oven in other respects may be of any desired construction.

I declare that what I claim is:—

1. Means for heating ovens for baking, roasting, drying and like purposes of the kind wherein the heating of the oven chamber is effected by hermetically sealed liquid-containing tubes to one end of which heat is applied, characterized by the feature that each tube at the end to be heated is separately surrounded by a tubular casing of refractory material spaced therefrom so as to form a heating-chamber therefor, and is heated by a heating-burner capable of independent control located in said casing.

2. Means for heating ovens for baking, roasting, drying and like purposes of the kind wherein the heating of the oven-chamber is effected by hermetically sealed liquid-containing tubes to one end of which heat is applied, comprising in combination a plurality of said heating tubes, a tubular casing of refractory material arranged to surround each separate tube at the end to be heated and spaced therefrom so as to form a heating-chamber therefor, a burner capable of independent control located in each of said casings, and means for conveying the heated products of combustion from said tube-heating casings and further utilizing them in the heating of the oven.

3. Means for heating ovens for baking, roasting, drying and like purposes of the kind wherein the heating of the oven-chamber is effected by hermetically sealed liquid-containing tubes to one end of which heat is applied, comprising in combination a plurality of said heating tubes, a closed tubular casing of refractory material arranged to surround each separate tube at the end to be heated and spaced therefrom so as to form a tube-heating chamber, a heating-burner capable of independent control located in said casing, an outlet in each of said tube-heating casings or chambers for the heated products of combustion, and means for collecting the said products of combustion from said casings and further utilizing them in the heating of the oven.

4. Means for heating ovens for baking, roasting, drying and like purposes of the kind wherein the heating of the oven-chamber is effected by hermetically sealed liquid-containing tubes to one end of which heat is applied, comprising in combination a plurality of said heating-tubes; a closed tubular casing of refractory material arranged to surround each separate tube at the end to be heated and spaced therefrom to form a heating chamber therefor; a burner in each of said casings adapted to produce a flame impinging on the end of the tube to be heated; a main pipe for supplying fuel to said burners, and branch pipes with controlling valves connecting each of said burners with the main fuel-supply pipe.

5. Means for heating ovens for baking, roasting, drying and like purposes of the kind wherein the heating of the oven-chamber is effected by hermetically sealed liquid-containing tubes to one end of which heat is applied, comprising in combination a plurality of said heating-tubes; a closed tubular casing arranged to surround each separate tube at the end to be heated and spaced therefrom, said tubular casing consisting of an inner casing of refractory material and an outer casing of metal; a heating-burner capable of independent control located in each of said tubular casings, and means for conveying the products of combustion from said tube-heating casings and further utilizing them in the heating of the ovens.

6. Means for heating ovens for baking, roasting, drying and like purposes of the kind wherein the heating of the oven-chamber is effected by hermetically sealed liquid-containing tubes to one end of which heat is applied, comprising in combination a plurality of said heating-tubes; a closed tubular casing of refractory material arranged to surround each separate tube at the end to be heated and spaced therefrom to form a heating-chamber therefor, said tube-heating casings being arranged in a vertical position externally on the side of the oven, and the end of each heating tube being passed through the wall of the oven and bent downwards within said casing; a burner capable of independent control located in the lower end of each of said casings; an opening in the upper end of each casing to form an outlet for the products of combustion; a chamber above the crown of the oven in communication with the tube-heating casings; and means for controlling the exit of the products of combustion from the casings.

In witness whereof, I have hereunto signed my name this 29th day of May, 1924.

WILLIAM DREDGE.